(12) United States Patent
Tseng et al.

(10) Patent No.: US 8,109,164 B2
(45) Date of Patent: Feb. 7, 2012

(54) LINEAR ACTUATOR

(75) Inventors: Hsien-Te Tseng, Sijhih (TW);
Chun-Chih Liu, Sijhih (TW)

(73) Assignee: Moteck Electric Corp., Sijhih (TW)

( * ) Notice: Subject to any disclaimer, the term of this patent is extended or adjusted under 35 U.S.C. 154(b) by 345 days.

(21) Appl. No.: 12/471,504

(22) Filed: May 26, 2009

(65) Prior Publication Data

US 2009/0293655 A1 Dec. 3, 2009

(51) Int. Cl.
*F16H 29/02* (2006.01)
(52) U.S. Cl. .................................................. 74/89.37
(58) Field of Classification Search ........... 74/89, 89.23, 74/89.37; 200/47, 329
See application file for complete search history.

(56) References Cited

U.S. PATENT DOCUMENTS

| | | | | |
|---|---|---|---|---|
| 3,529,104 A | * | 9/1970 | Angle | 200/47 |
| 5,901,610 A | * | 5/1999 | Schneider | 74/421 A |
| 6,240,800 B1 | * | 6/2001 | Bokamper et al. | 74/500 |
| 6,259,175 B1 | * | 7/2001 | Alfano et al. | 310/20 |
| 2002/0066325 A1 | * | 6/2002 | Roither et al. | 74/89.23 |

* cited by examiner

*Primary Examiner* — Vicky Johnson
(74) *Attorney, Agent, or Firm* — Muncy, Geissler, Olds & Lowe, PLLC

(57) ABSTRACT

A linear actuator includes a housing formed of a first half shell and a second half shell and defining an accommodation chamber, a front opening in front of the accommodation chamber and a receiving chamber at the bottom side of the accommodation chamber, a driving mechanism having a push rod movably mounted in the accommodation chamber and extending out of the front opening, a motor mounted outside the accommodation chamber and a spindle coupled to and rotatable by the motor for causing the transmission shaft to reciprocate, and limit switches detachably mounted in the receiving chamber for stopping the motor upon movement of the transmission shaft to a front or rear limit position.

10 Claims, 7 Drawing Sheets

LINEAR ACTUATOR

This application claims the priority benefit of Taiwan patent application number 097209674 filed on Jun. 2, 2008.

BACKGROUND OF THE INVENTION

1. Field of the Invention

The present invention relates to a linear actuator and more particularly, to the structural design of the housing of a linear actuator, which is formed of two half shells, facilitating installation and position adjustment of limit switches.

2. Description of the Related Art

Many linear actuators are known and intensively used in electric hospital beds, treadmills and to facilitate position adjustment. During application of a linear actuator, limit switches are usually used and respectively mounted in the start end and finish end to control the forward and return strokes of the linear actuator. When a push block of a nut of the linear actuator touches the limit switch at the finish end during the forward stroke, the limit switch is triggered to stop forward movement of the linear actuator. On the contrary, when the push block of the nut touches the limit switch at the start end during the return stroke, the limit switch is triggered to stop backward movement of the linear actuator. Thus, the linear actuator is controlled to reciprocate with the start end and the finish end.

FIG. 7 is an exploded view of a linear actuator according to the prior art. According to this design, the linear actuator comprises a housing A, a driving mechanism B, and two limit switches C. The housing A comprises a hollow base A1, and an outer tube A2 that extends from one side of the hollow base A1 and defines therein a longitudinal receiving chamber A21. The driving mechanism B comprises a motor B1 fastened to one side of the hollow base A1 of the housing A, a worm B11 fixedly connected to the output shaft of the motor B1 and inserted into the inside of the hollow base A1 of the housing A, a spindle B2 rotatable mounted in the longitudinal receiving chamber A21 of the outer tube A2 of the housing A, a worm gear B21 fixedly mounted on one end of the spindle B2 and meshed with the worm B11, a nut B3 threaded onto the spindle B2 and supported inside the longitudinal receiving chamber A21 of the outer tube A2 of the housing A and movable linearly relative to the spindle B2 during rotation of the spindle—B2, and a push rod 4 threaded onto the spindle B2 and extending out of the outer tube A2 of the housing A for connection to an external driven member. The nut B3 has a push block B31 protruded from the periphery thereof. Further, a rail C1 is mounted in a longitudinal groove A22 inside the longitudinal receiving chamber A21 of the outer tube A2. Further, two limit switches C are mounted on the rail C1 at selected locations at two opposite sides relative to the push block B31 of the nut B3 at the spindle B2.

When started the motor B1, the worm B11 is driven to rotate the worm gear B21 and the spindle B2, causing forward or backward movement of the nut B3 and the transmission shaft B4 relative to the spindle B2. When the nut B3 reaches a predetermined position, it will touch one limit switch C, causing the limit switch C to stop the motor B1. In actual practice, this design of linear actuator still has drawbacks as described hereinafter.

During installation of the linear actuator, the rail C1 and the limit switches C are mounted in the longitudinal groove A22 inside the longitudinal receiving chamber A21 of the outer tube A2 of the housing A subject to the use of a scale, and then the spindle—B2 and the nut B3 are inserted from one end of the longitudinal receiving chamber A21 into the inside of the outer tube A2 of the housing A, and then the transmission shaft B4 is inserted from the other end of the longitudinal receiving chamber A21 into the inside of the outer tube A2 of the housing A and threaded onto the spindle—B2. During insertion of the spindle B2 and the nut B3 into the longitudinal receiving chamber A21 of the outer tube A2 of the housing A, the limit switches C may be biased accidentally by the push block B31 of the nut B3. When this problem happens, the user needs to re-install the rail C1 and the limit switches C. Further, when wishing to adjust the positions of the limit switches C, the user needs to detach all the parts of the linear actuator, solder the limit switches on the other position and rearrange the wires accordingly.

Therefore, it is desirable to provide a linear actuator that eliminates the aforesaid drawbacks.

SUMMARY OF THE INVENTION

The present invention has been accomplished under the circumstances in view. It is one object of the present invention to provide a linear actuator, which assures positive positioning of the component parts and allows quick detachment of the housing for easy installation and position adjustment of limit switches.

To achieve this and other objects of the present invention, the linear actuator comprises a housing, a driving mechanism, which is mounted in the housing and comprises a motor, a spindle-coupled to and rotatable by the motor and a push rod coupled to the spindle for a linear motion upon rotation of the spindle, and at least one limit switch controllable by the nut of the push rod to switch off the motor. The housing is formed of a first half shell and a second half shell. The first half shell and the second half shell are fastened together, defining an accommodation chamber that accommodates the spindle and the push rod of the driving mechanism, a front opening in communication with the front end of the accommodation chamber for the passing of the push rod to the outside of the housing, and a receiving chamber at one side of the accommodation chamber for the positioning of the at least one limit switch.

The housing comprises a tubular front coupling portion formed of a front part of the first half shell and a front part fastened to the tubular front coupling portion to reinforce the strength of the housing.

DETAILED DESCRIPTION OF THE PREFERRED EMBODIMENT

Figure 1:
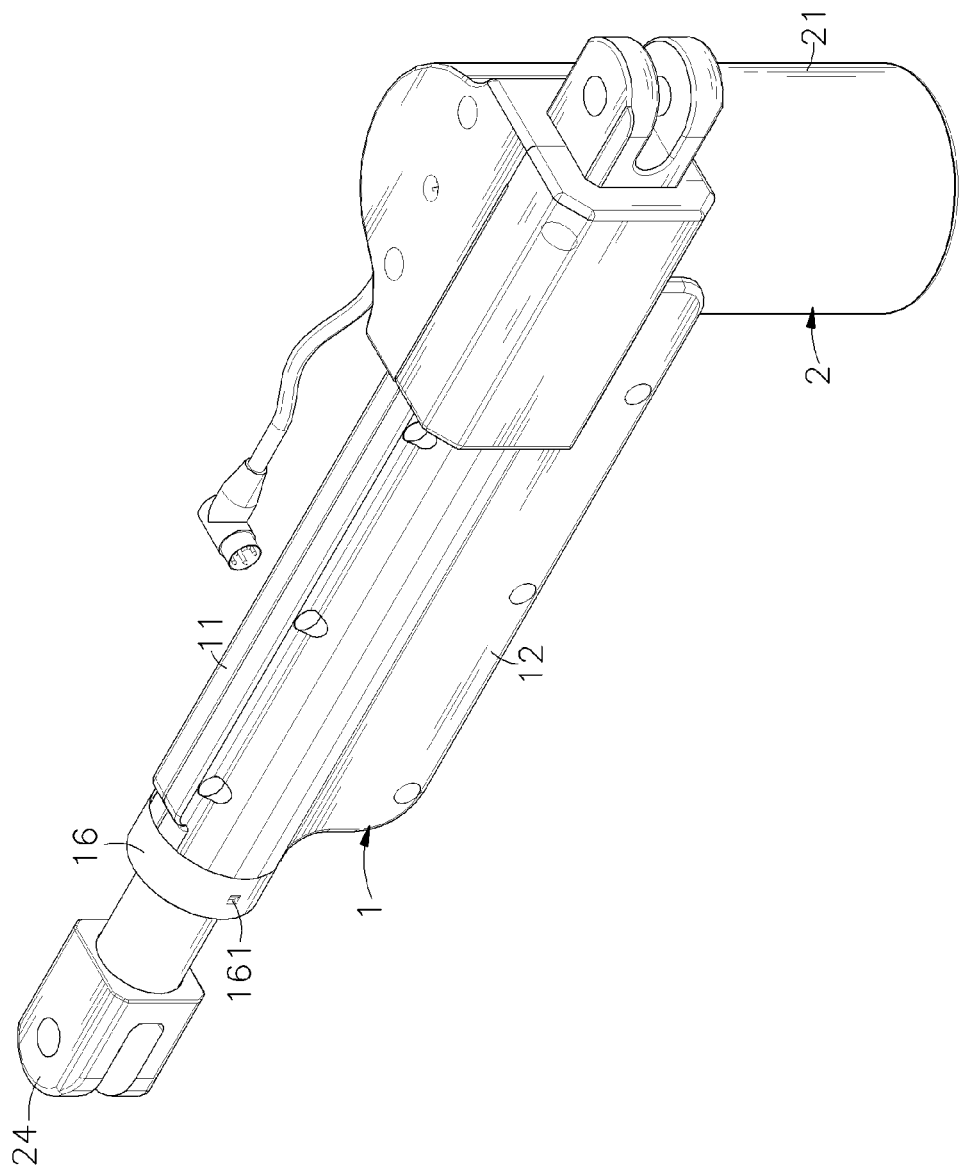
FIG. 1 is an elevational view of a linear actuator in accordance with the present invention.
Figure 2:
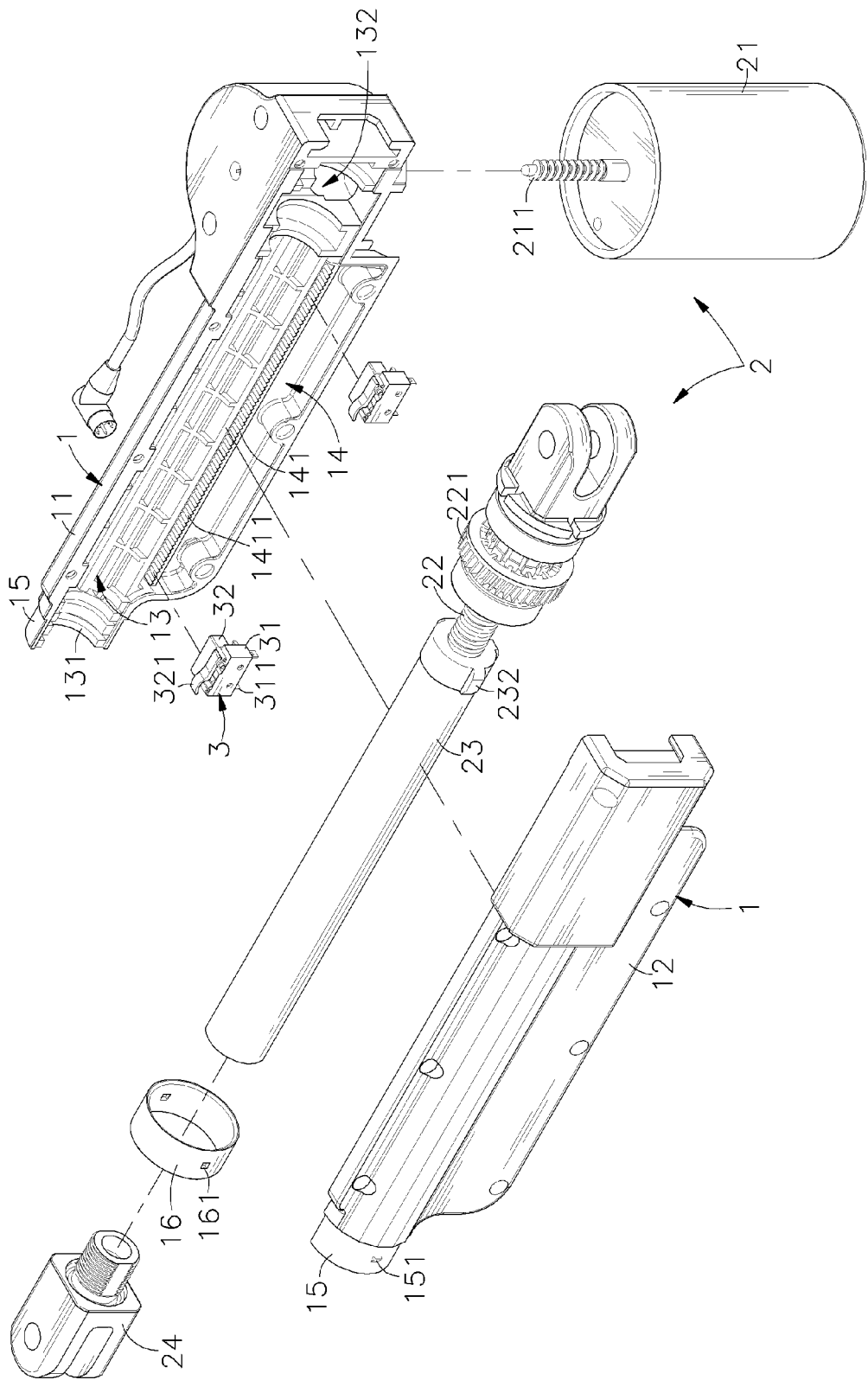
FIG. 2 is an exploded view of the linear actuator in accordance with the present invention.
Figure 3:
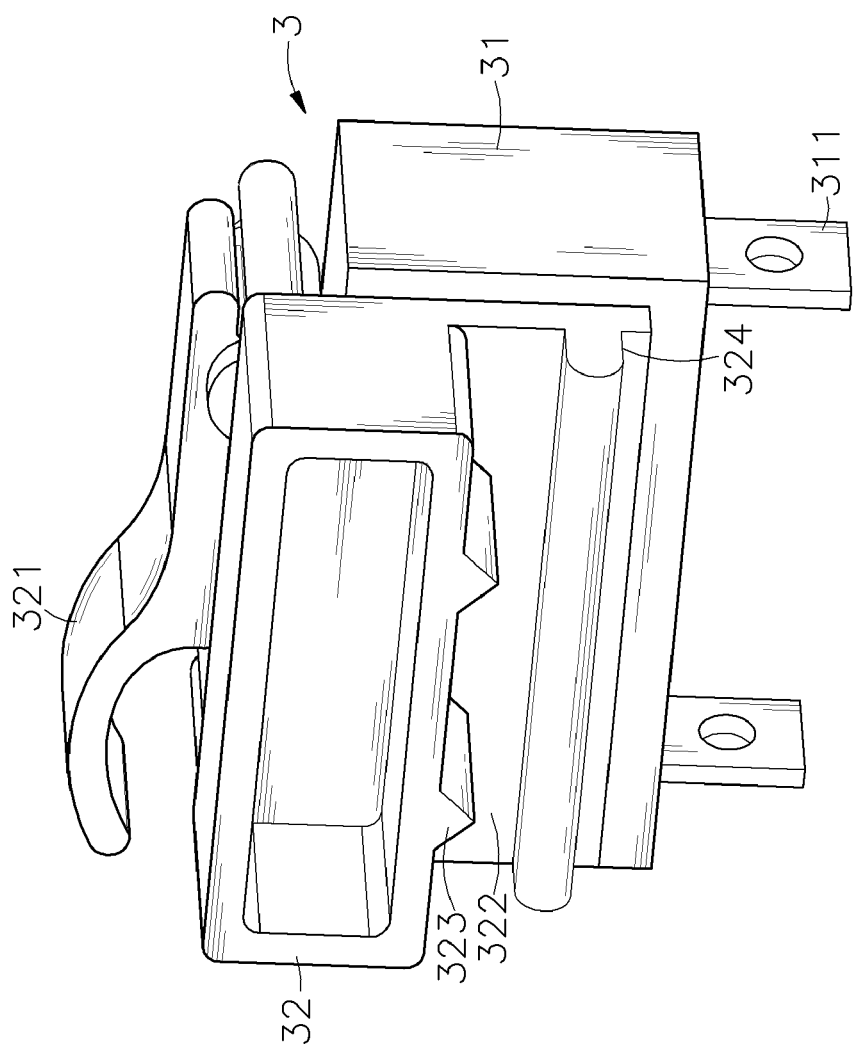
FIG. 3 is an elevational view of a limit switch for the linear actuator in accordance with the present invention.
Figure 4:
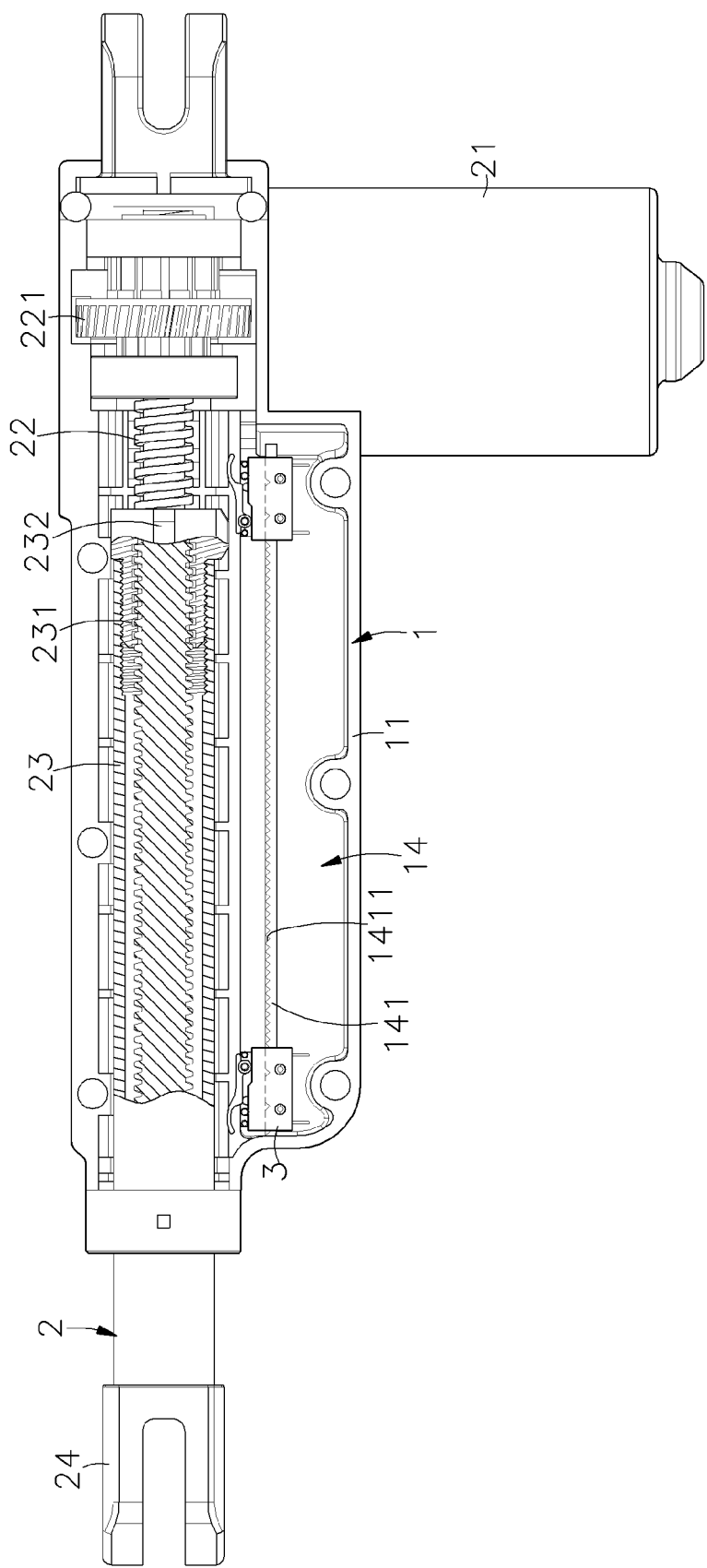
FIG. 4 is a sectional view of the linear actuator in accordance with the present invention.
Figure 5:
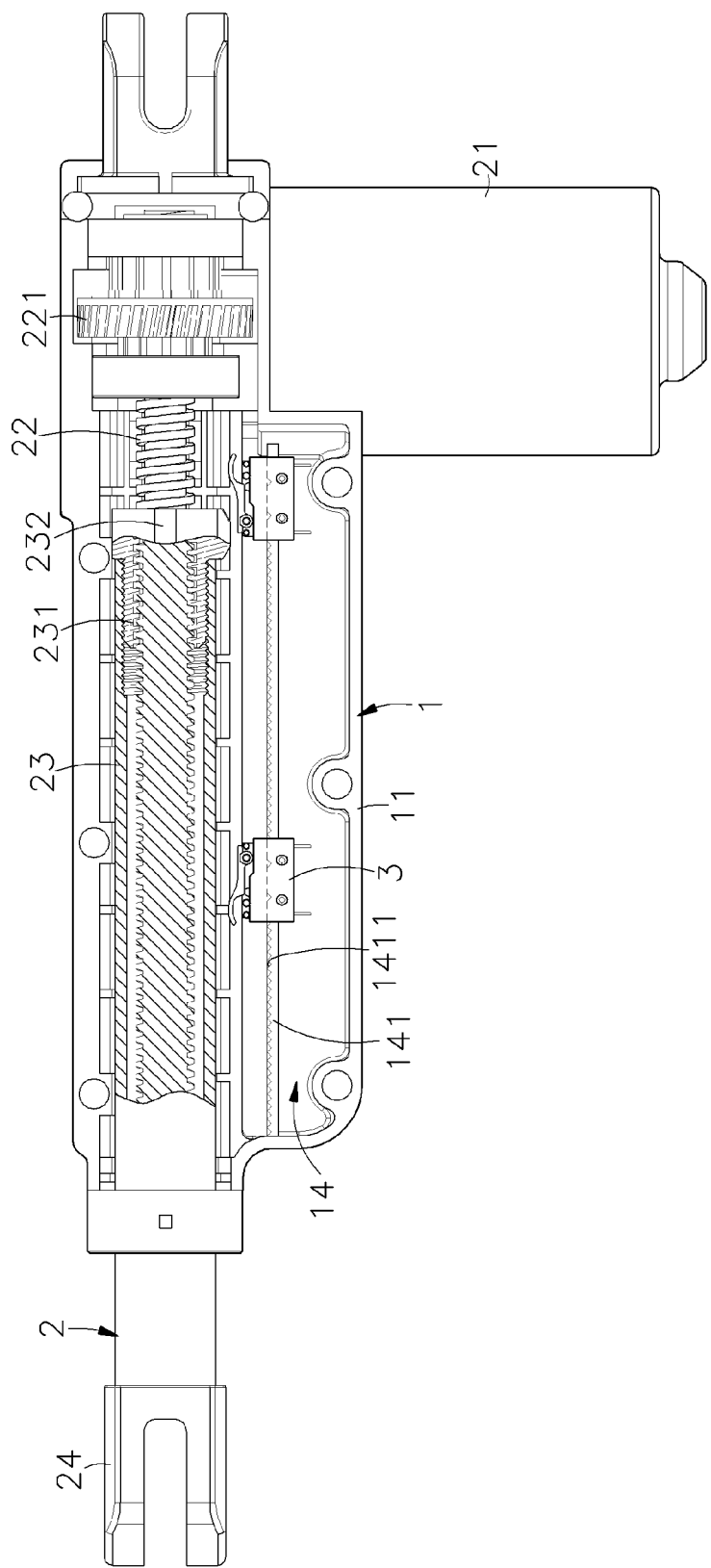
FIG. 5 corresponds to FIG. 4, showing the position of the front limit switch adjusted.

Referring to FIGS. 1~4, a linear actuator in accordance with the present invention is shown comprising a housing 1, a driving mechanism 2 and at least one, for example, two limit switches 3.

The housing 1 is formed of a first half shell 11 and a second half shell 12, having an accommodation chamber 13 extending along the length thereof, a front opening 131 located on one end of the accommodation chamber 13, a rear compartment 132 located on the other end of the accommodation chamber 13, a bottom receiving chamber 14 located on the bottom side of the accommodation chamber 13, a longitudinal seat 141 set between the accommodation chamber 13 and the bottom receiving chamber 14, a series of transverse grooves 1411 located on the longitudinal seat 141 and facing the inside of the accommodation chamber 13, a tubular front coupling portion 15 extending around the front opening 131, at least one, for example, and two raised portions 151 protruded from the periphery at two opposite sides. Further, a metal retaining ring 16 is capped on the tubular front coupling portion 15, having two retaining holes 161 respectively forced into engagement with the raised portions 151.

The driving mechanism 2 comprises a motor 21, a worm 211 connected to and rotatable by the motor 21, a push rod 23 having an inner thread 231 axially located on the inside and a nut—232 protruded from the periphery of one end thereof, a spindle 22 threaded into the inner thread 231 of the push rod 23, a worm gear 221 fixedly mounted on one end of the spindle 22 and meshed with the worm 211, and a connector 24 connected to the other end of the push rod 23 remote from the nut 232 for the connection of an external device to be driven by the linear actuator.

Each limit switch 3 comprises a switch body 31, and a positioning device 32 disposed at one side relative to the switch body 31. The switch body 31 has a plurality of electrode pins 311 located on the bottom side thereof. The positioning device 32 has a button 321 protruded from the top wall thereof and suspending above the switch body 31 and adapted for triggering the switch body 31, a locating groove 322 located on one lateral side thereof opposite to the switch body 31, at least one, for example, two protruding blocks 323 suspending in one side, namely, the top side of the locating groove 322, and a retaining portion 324 located on the other side, namely, the bottom side of the locating groove 322.

During the assembly process of the linear actuator, perpendicularly attach the motor 21 of the driving mechanism 2 to the rear end of the housing 1 to insert the worm 211 of the motor 21 into the rear compartment 132 of the housing 1 and then fixedly secure the motor 21 to the housing 1, and then thread the spindle—22 into the inner thread 231 of the push rod 23 and put the push rod—23 with the spindle 22 in the accommodation chamber 13 of the housing 1 to force the worm gear 221 into engagement with the worm 211 of the motor 21 and to have the push rod 23 extend out of the accommodation chamber 13 to the outside of the housing 1 through the front opening 131, and then fasten the limit switches 3 to the front and rear sides of the longitudinal seat 141 in the bottom receiving chamber 14 of the housing 1 to aim the button 321 of each limit switch 3 at the nut 232 of the push rod 23, and then fasten the first half shell 11 and second half shell 12 of the housing 1 together and attach the metal retaining ring 16 to the tubular front coupling portion 15 of the housing 1 to force the two retaining hole 161 of the metal retaining ring 16 into engagement with the raised portions 151 of the tubular front coupling portion 15 respectively and to reinforce the strength of the housing 1.

According to the present preferred embodiment, the first half shell 11 and second half shell 12 of the housing 1 are respectively molded from a plastic material. Alternatively, a metal material can be used to make the first half shell 11 and second half shell 12 of the housing 1.

Referring to FIG. 5 and FIGS. 2~4 again, when started the motor 21 to rotate the worm 211 clockwise or counter-clockwise, the worm 211 drives the worm gear 221 to rotate the spindle 22 in the inner thread 231 of the push rod 23, causing the push rod 23 to be moved linearly forwards or backwards. Further, the electrode pins 311 of the limit switches 3 are respectively electrically connected to the circuit (not shown) at the start end and finish end of the linear stroke.

When the nut 232 of the push rod 23 reaches the finish end during a forward linear motion of the push rod 23 subject to clockwise rotation of the spindle 22, the nut 232 touches the button 321 of the limit switch 3 at the finish end, causing the limit switch 3 at the finish end to switch off the motor 21, avoiding disconnection of the push rod 23 from the front end of the spindle—22. On the contrary, when the nut 232 of the push rod 23 reaches the start end during a backward linear motion of the push rod—23 subject to counter-clockwise rotation of the spindle 22, the nut—232 touches the button 321 of the limit switch 3 at the start end, causing the limit switch 3 at the start end to switch off the motor 21, avoiding locking of the spindle 22 and preventing worm gear damage.

The distance between the two limit switches 3 is determined subject to the designed distance of the linear stroke of the nut 232. Further, the positioning device 32 of each limit switch 3 is fastened to the longitudinal seat 141 in the bottom receiving chamber 14 of the housing 1 by means of forcing the protruding blocks 323 into engagement with the transverse grooves 1411 on the longitudinal seat 141 to have the longitudinal seat 141 is received in the locating groove 322 and retaining portion 324 be abutted against the bottom side of the longitudinal seat 141. When wishing to adjust the distance between the two limit switches 3, remove the metal retaining ring 16 from the tubular front coupling portion 15 of the housing 1, and then separate the first half shell 11 and second half shell 12 of the housing 1, and then pull the limit switch 3 away from the longitudinal seat 141, and then reinstall the limit switch 3 in the longitudinal seat 141 at the selected location.

Further, the formation of the series of transverse grooves 1411 on the longitudinal seat 141 constitutes a rack for engagement with the tooth-like protruding blocks 323 of the positioning device 32 of each limit switch 3. Further, the protruding blocks 323 can be made having a rectangular, dovetail-like or arched profile for positive engagement with the series of transverse grooves 1411 on the longitudinal seat 141 and easy removal of the respective limit switch 3 from the longitudinal seat 141.

Figure 6:
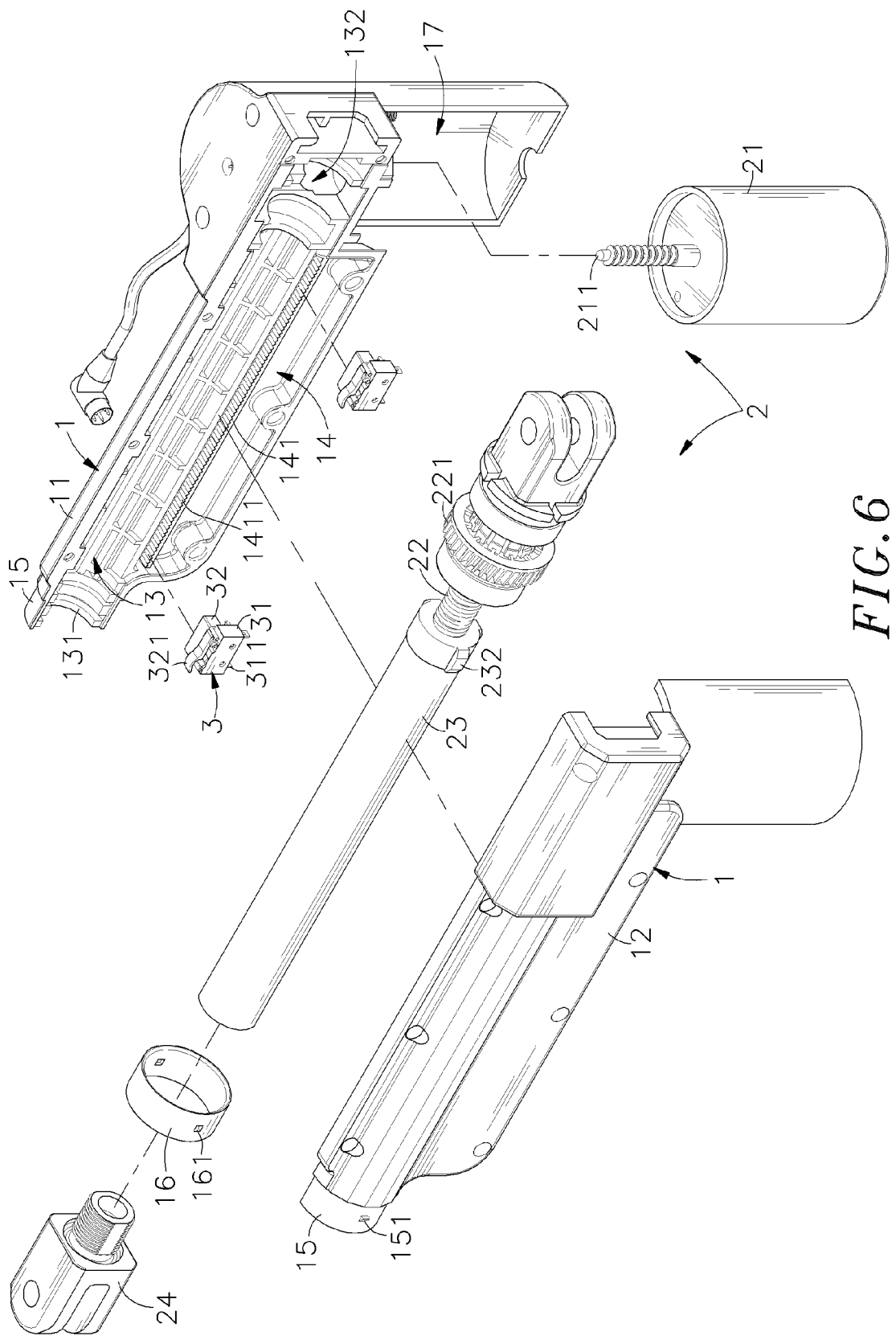
FIG. 6 is an exploded view of an alternate form of the linear actuator in accordance with the present invention.
Figure 7:
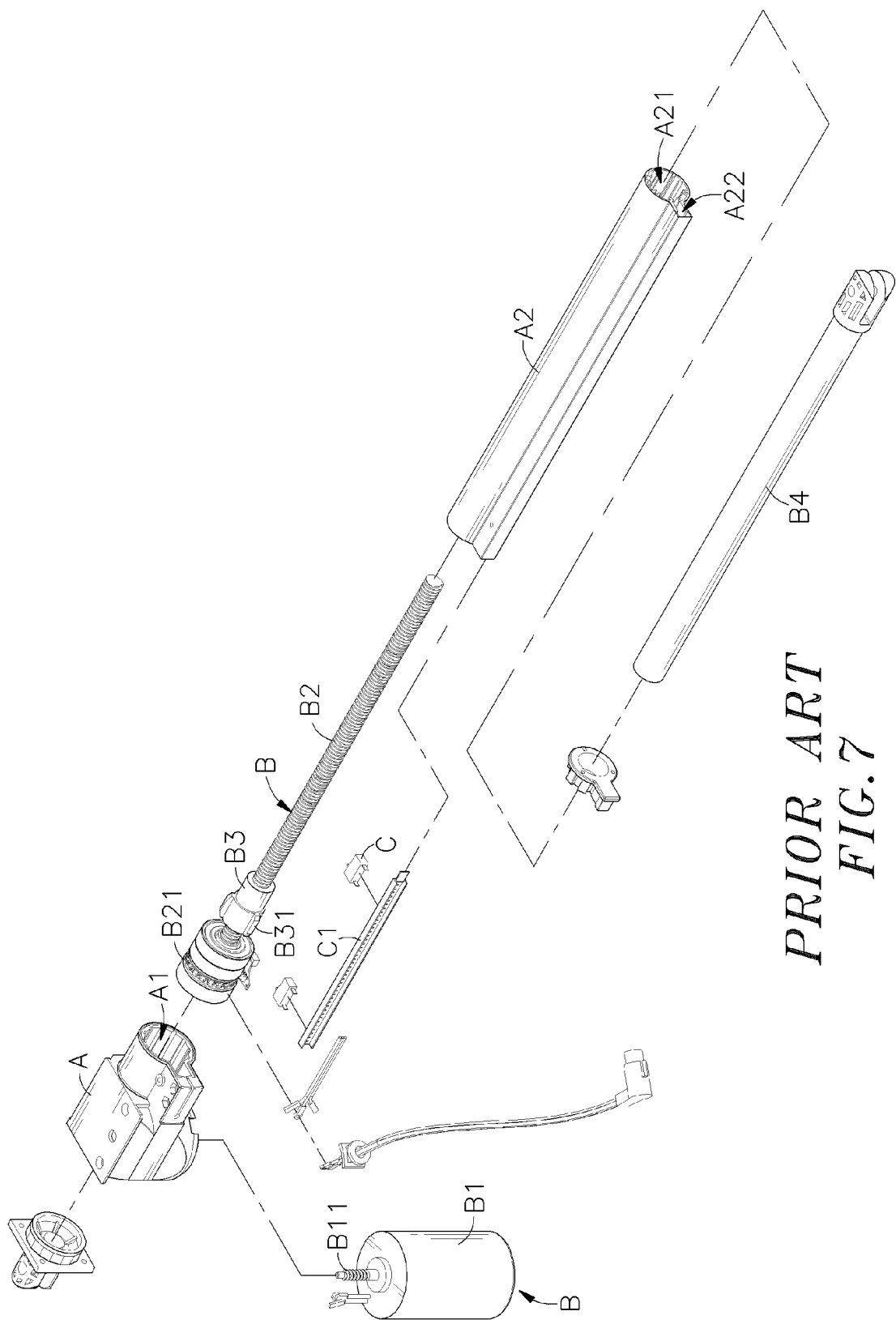
FIG. 7 is an exploded view of a linear actuator according to the prior art.

FIG. 6 is an exploded view of an alternate form of the linear actuator. According to this alternate form, the housing 1 has a motor chamber 17 perpendicularly connected to the rear compartment 132 for accommodating the motor 21 of the driving mechanism 2. Therefore, the motor 21 is well protected in the motor chamber 17 and will not be forced to bias during delivery of the linear actuator, avoiding improper engagement between the worm gear 221 and the worm 211 or any possible gear tooth damage. Further when the motor 21 in the motor chamber 17 also prevent it from water and dust.

In the aforesaid embodiment, the positioning device 32 of each limit switch 3 is fastened to the longitudinal seat 141 in the bottom receiving chamber 14 of the housing 1 by means of forcing the protruding blocks 323 into engagement with the transverse grooves 1411 on the longitudinal seat 141, however this arrangement is not a limitation; alternatively the positioning device 32 of each limit switch 3 can be fastened to the longitudinal seat 141 in the bottom receiving chamber 14 of the housing 1 by a screw joint.

In general, the invention provides a linear actuator, which has the following advantages and features:

1. The first half shell 11 and the second half shell 12 constitute the housing 1, and the metal retaining ring 16 is fastened to the tubular front coupling portion 15 of the housing 1 to force the two retaining holes 161 of the metal retaining ring 16 into engagement with the raised portions 151 of the tubular front coupling portion 15 and to reinforce the strength of the housing 1. When wishing to adjust the positions of the limit switches 3, the user can remove the metal retaining ring 16 from the tubular front coupling portion 15 of the housing 1 and then separate the first half shell 11 and the second half shell 12 for allowing re-installation of the limit switches 3. Therefore, the invention facilitates adjustment of the positions of the limit switches 3 and avoids displacement of the limit switches 3 due to accidental touching by the spindle 22 or push rod 23 during installation of the driving mechanism 2.

2. The first half shell 11 and second half shell 12 of the housing 1 are molded from plastics for the advantages of ease of fabrication and low manufacturing cost. The use of the metal retaining ring 16 assures tight connection of the first half shell 11 and the second half shell 12 and reinforces the strength of the housing 1, avoiding vibration of the push rod 23 during operation of the driving mechanism 2.

A prototype of linear actuator has been constructed with the features of FIGS. 1~6. The linear actuator functions smoothly to provide all of the features disclosed earlier.

Although a particular embodiment of the invention has been described in detail for purposes of illustration, various modifications and enhancements may be made without departing from the spirit and scope of the invention. For example, any other linear transmission structures may be used to substitute for the worm and worm gear for transmission of rotary driving force from the motor to the spindle; the metal retaining ring can be made having raised portions and the tubular front coupling portion can be made having retaining holes for engagement with the raised portions of the metal retaining ring. Accordingly, the invention is not to be limited except as by the appended claims.

What the invention claimed is:

1. A linear actuator, comprising a housing, a driving mechanism mounted in said housing, said driving mechanism comprising a motor, a spindle coupled to and rotatable by said motor, and a push rod coupled to said spindle for a linear motion upon rotation of said spindle, and at least one limit switch controllable by a transmission shaft to switch off said motor, wherein:

said housing is formed of a first half shell and a second half shell, said first half shell and said second half shell being fastened together, defining an accommodation chamber that accommodates said spindle and said push rod of said driving mechanism, a front opening in communication with a front end of said accommodation chamber for the passing of said push rod to the outside of said housing, and a receiving chamber at one side of said accommodation chamber for the positioning of said at least one limit switch; said housing comprises a longitudinal seat set between said accommodation chamber and said receiving chamber, a series of transverse grooves located on said longitudinal seat and facing the inside of said accommodation chamber; each said limit switch comprises a switch body, a button suspending above said switch body for triggering said switch body by said push rod upon movement of said transmission shaft to a predetermined position, and a positioning device located on one side of said switch body for positioning in said longitudinal seat, said positioning device comprising a locating groove, which receives said longitudinal seat, and at least one protruding block suspending in one side of said locating groove and forced into engagement with said series of transverse grooves; and wherein said positioning device of each said limit switch comprises a retaining portion located on an opposite side of said locating groove and abutted against a bottom side of said longitudinal seat.

2. The linear actuator as claimed in claim 1, wherein said housing comprises a tubular front coupling portion formed of a front part of said first half shell and a front part of said second half shell and extending around said front opening, and a metal retaining ring fastened to said tubular front coupling portion.

3. The linear actuator as claimed in claim 1, wherein said tubular front coupling portion comprises at least one male retaining member; said metal retaining ring comprises at least one female retaining member respectively forced into engagement with the male retaining member at said tubular front coupling portion.

4. The linear actuator as claimed in claim 1, wherein said tubular front coupling portion comprises at least one female retaining member; said metal retaining ring comprises at least one male retaining member respectively forced into engagement with the female retaining member of said tubular front coupling portion.

5. The linear actuator as claimed in claim 4, wherein housing further comprises a rear compartment that accommodates said worm gear, and a motor chamber perpendicularly connected to said rear compartment and accommodating said motor.

6. The linear actuator as claimed in claim 1, wherein said motor is mounted outside said accommodation chamber, comprising an output shaft terminating in a worm and suspending in said accommodation chamber; said driving mechanism further comprises a worm gear fixedly mounted on one end of said spindle and meshed with the worm of said motor.

7. The linear actuator as claimed in claim 1, wherein said push rod comprises an inner thread meshed with said spindle.

8. The linear actuator as claimed in claim 1, wherein said transmission shaft comprises a nut protruded from the periphery thereof for triggering a button of each said limit switch.

9. The linear actuator as claimed in claim 1, wherein each said limit switch comprises a plurality of electrode pins downwardly extending from said switch body.

10. The linear actuator as claimed in claim 1, wherein said first half shell and said second half shell of said housing are molded from a plastic material.

* * * * *